United States Patent [19]
Akiyama et al.

[11] Patent Number: 5,801,908
[45] Date of Patent: Sep. 1, 1998

[54] MAGNETIC DISK DRIVE COMPRISING ROTARY ACTUATOR ARM HAVING OPTIMAL ARM LENGTH FOR MINIMIZING TRACK MISREGISTRATION

[75] Inventors: Junichi Akiyama, Kawasaki; Tetsuo Inoue, Ichikawa, both of Japan

[73] Assignee: Kabushiki Kaisha Toshiba, Kawasaki, Japan

[21] Appl. No.: 720,918

[22] Filed: Oct. 7, 1996

Related U.S. Application Data

[63] Continuation of Ser. No. 328,340, Oct. 21, 1994, abandoned, which is a continuation of Ser. No. 19,875, Feb. 19, 1993, abandoned.

[30] Foreign Application Priority Data

Feb. 21, 1992  [JP]  Japan .................. 4-034952

[51] Int. Cl.$^6$ .................. G11B 5/33; G11B 5/55
[52] U.S. Cl. .................. 360/106; 360/113
[58] Field of Search .................. 360/103–106, 360/109, 113, 125, 126, 121

[56] References Cited

U.S. PATENT DOCUMENTS

| | | | |
|---|---|---|---|
| 479,703 | 4/1892 | Brown et al. | 360/106 |
| 4,814,908 | 3/1989 | Schmitz | 360/109 |
| 4,896,233 | 1/1990 | Yamada | 360/104 |
| 4,926,275 | 5/1990 | Kuno et al. | 360/104 |
| 5,010,430 | 4/1991 | Yamada et al. | 360/103 |
| 5,012,355 | 4/1991 | Taga et al. | 360/84 |
| 5,019,930 | 5/1991 | Takeya | 360/103 |
| 5,029,030 | 7/1991 | Luecke | 360/106 |
| 5,153,870 | 10/1992 | Lee et al. | 369/111 |
| 5,189,578 | 2/1993 | Mori et al. | 360/109 |
| 5,218,497 | 6/1993 | Tanabe et al. | 360/113 |
| 5,227,212 | 7/1993 | Ahlert et al. | 360/113 |
| 5,251,082 | 10/1993 | Elliot et al. | 360/106 |
| 5,257,149 | 10/1993 | Meyer | 360/78.14 |
| 5,303,105 | 4/1994 | Jorgenson | 360/106 |
| 5,307,217 | 4/1994 | Saliba | 360/121 |

FOREIGN PATENT DOCUMENTS

| | | | |
|---|---|---|---|
| 63-197016 | 8/1963 | Japan . | |
| 63-52383 | 3/1988 | Japan | 360/109 |
| 2-227886 | 9/1990 | Japan | 360/109 |
| 3-17872 | 1/1991 | Japan | 360/109 |

*Primary Examiner*—Jefferson Evans
*Attorney, Agent, or Firm*—Oblon, Spivak, McClelland, Maier & Neustadt, P.C.

[57] ABSTRACT

A magnetic disk drive that records and reproduces data onto and from a magnetic disk is provided with a rotary actuator arm tilt which has a length such that the variation of the skew angle formed where a line, connecting the center of rotation of rotary actuator, and one end of the rotary actuator crosses the track moving direction of the magnetic disk is a minimum. A composite head unit is provided and composed of a write head and a read head integrated into a single unit which is mounted on the rotary actuator arm, wherein in order to minimize the largest absolute value of the skew angle formed where the disk radius direction crosses the track width direction of the composite magnetic head on a given write track in the range from the innermost write track position to the outermost write track position. The composite magnetic head unit is constructed to meet at least either the condition that the unit is mounted obliquely with respect to a line connecting the center of rotation of the actuator and the composite magnetic head unit or the condition that the write head and the read head are stacked with the write head being shifted from the read head in the track width direction toward the outer circumference or the inner circumference to compensate for a track deviation due to the skew angle.

12 Claims, 12 Drawing Sheets

MAGNETIC DISK DRIVE COMPRISING ROTARY ACTUATOR ARM HAVING OPTIMAL ARM LENGTH FOR MINIMIZING TRACK MISREGISTRATION

This application is a Continuation of application Ser. No. 08/328,340, filed on Oct. 21, 1994, now abandoned, which is a Continuation of application Ser. No. 08/019,875, filed on Feb. 19, 1993, now abandoned.

BACKGROUND OF THE INVENTION

1. Field of the Invention

This invention relates to a magnetic disk drive such as a hard disk drive or a floppy disk drive of the rotary actuator type using a composite magnetic head made up of a write head and a read head.

2. Description of the Related Art

In conventional magnetic disk drives, regardless of their access system, there is no possibility that the write track position and the read track position on a magnetic disk deviate from each other, since a single magnetic head (having only one magnetic gap) is used to record and reproduce the signal.

Because recording and reproducing are done with the same head in such conventional heads, it is impossible to optimize the performance of recording and reproducing. One known technique for solving such a problem is to combine a write head and a read head into a composite arrangement that enables independent optimization of recording and reproducing. A head in which a write head and a read head are formed into a composite arrangement as noted above is called a composite head, hereinafter.

The composite head is made up of, for example, the following write and read heads (which are stacked in the case of the thin-film type): the write head is a head composed of a ring core designed to perform the optimum signal recording and a magnetomotive force generating coil (hereinafter, for convenience's sake, referred to as an inductive head as conventionally called according to the principle of reproduction, although the name is unsuitable for the write head), and the read head is such a head as an optimally designed inductive read head or a highly sensitive magnetoresistive read head (hereinafter, referred to as an MR head).

When considering recent and future movement toward more compact and higher density magnetic disk drives, use of a composite head composed of a read head and an inductive write head is promising, the read head being an MR head that has a higher reproduction sensitivity than the conventional inductive head and provides the reproduced output unrelated to the relative speed of the head and disk.

For compact hard disk drives, only rotary actuators are used which have such advantages as a simpler arrangement, lower cost, higher vibration resistance, and lower power consumption than linear actuators.

Figure 1:
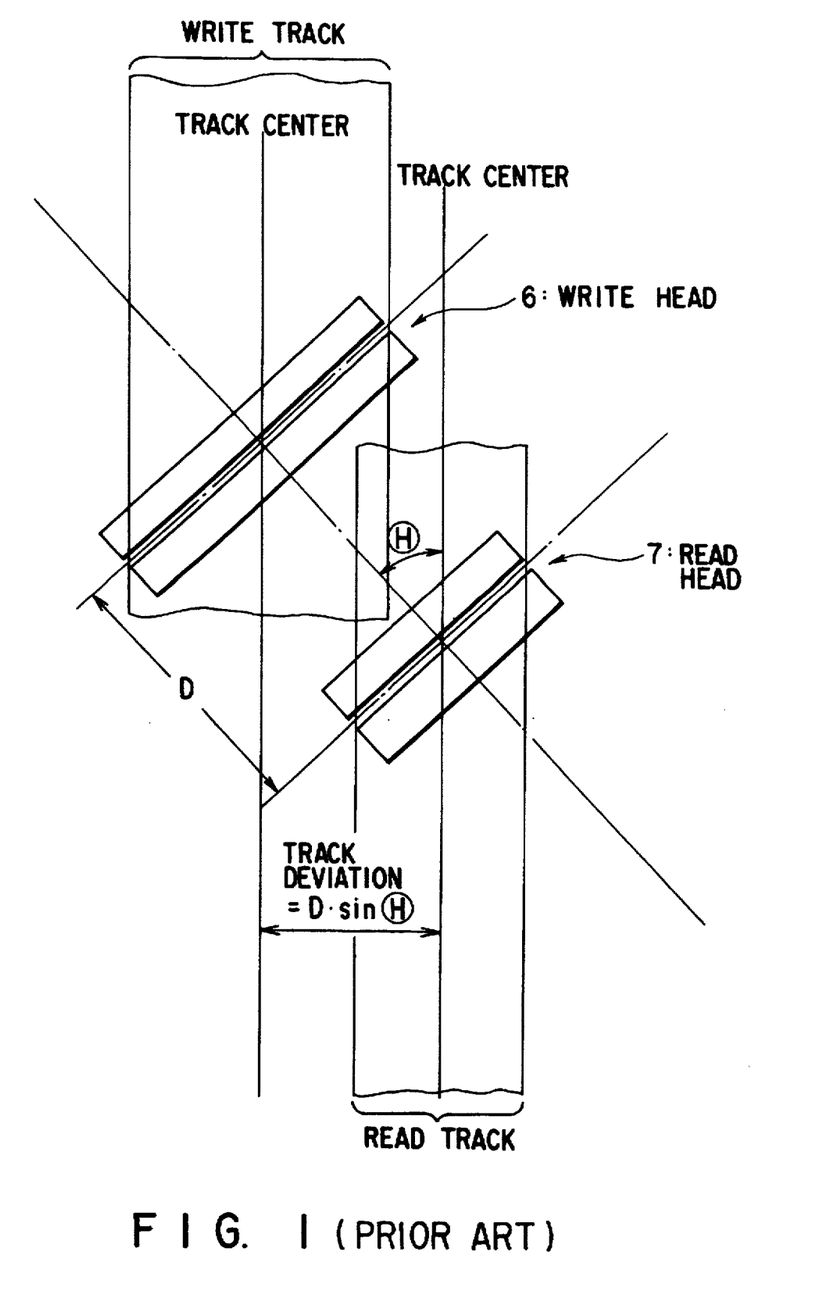
FIG. 1 is a diagram for explaining a track deviation due to the skew angle, a problem of the prior art.

FIG. 1 shows a case where a magnetic disk drive of the rotary actuator system is constructed by using a composite head made up of a write head and a read head, such as a composite thin-film magnetic head of a stacked arrangement where an inductive magnetic head is used as a write head and an MR head as a read head. In FIG. 1, when the composite magnetic head is caused to access in the range from the innermost write track to the outermost write track by rotating the arm of the actuator, a deviation (hereinafter, referred to as a track deviation) between the write track position and the read head position on the magnetic disk is generally caused by the existence of the angle (hereinafter, referred to as the skew angle) created between a magnetic gap length direction of said magnetic gap and a rotating direction of said magnetic disk on a given write track in the range from the innermost write track to the outermost write track. That is, the skew angle is an angle formed between the lengthwise direction of the magnetic gap of a read/write element, (i.e., a composite magnetic head), and the rotating direction of a magnetic disk. The skew angle is not to be confused with the yaw angle which is an angle formed between the lengthwise direction of a magnetic head slider, (not the magnetic gap), and the rotating direction of the magnetic disk. If a skew angle is θ, the track deviation is expressed as D·sinθ, where D is the distance between the magnetic gap in the write head 6 and that in the read head 7 (in the case of the MR head, it is assumed to mean the central position of the reproduce element effective portion. Hereinafter, it is simply referred to as the magnetic gap for the sake of convenience).

When the density of write tracks is low, the ratio of the track deviation to the track pitch (track width) is low (i.e., wide write—narrow read system). Therefore, since the track width of the read head can be compensated for without introducing a large decrease in the signal-to-noise ratio of the reproduced signal by making the track width of the read head smaller than that of the write head, a track deviation is less significant. As the ratio of the track deviation to the track width increases with the increase of the track density, the track density cannot be increased because of deterioration of the quality of reproduced signal, unless the track deviation is minimized. At present, however, no effective way to solve such a problem has been disclosed.

As described above, when a composite head made up of a write head and a read head is used in a rotary actuator-type magnetic disk drive, an attempt to increase the track density generally leads to a deviation between the write track and the read track. The deviation gives rise to the inconveniences that the read track goes beyond the write track, which prevents a high-quality reproduction of recorded signals, making it difficult to raise the track density.

It is considered to offset predetermined amounts of the magnetic head in order that the write head is tracked on during recording, and the read head is tracked on during reproducing. Since writing data also requires the reading of data written in index regions, the data written in the index regions are read out with off set state during recording. It is desirable that there should be no track deviation concerning the write head and read head. A method to achieve this has been wanted.

SUMMARY OF THE INVENTION

The object of the present invention is to provide a magnetic disk drive capable of improving the track density by eliminating a deviation between the write track and the read track in a rotary actuator-type magnetic disk drive using a composite magnetic head composed of a write head and a read head.

A first magnetic disk drive of the present invention is characterized by comprising: a rotary actuator arm with one end secured to the center of rotation and the other end which has such a length that the variation of the angle formed where a line connecting the center of rotation and the other end crosses the track moving direction of the magnetic disk is almost the smallest in the range from the innermost track and the outermost track; and a composite head unit composed of a write head and a read head integrated into a single unit which is mounted on the rotary actuator arm, wherein in order to minimize the largest absolute value of the skew angle created between a magnetic gap length direction of said magnetic gap in a rotating direction of said magnetic disk on a given write track in the range from the innermost write track position to the outermost write track position, the composite magnetic head unit is constructed so as to meet at least either the condition that the unit is mounted obliquely with respect to a line connecting the center of rotation of the actuator and the composite magnetic head unit or the condition that the write head and the read head are stacked with the write head being shifted from the read head in the track width direction toward the outer circumference or the inner circumference so as to compensate for a track deviation due to the skew angle.

The operation of the first magnetic disk drive constructed as described above will be explained, referring to FIGS. 1, 2, 3, and 4. As noted earlier, since the amount of the positional deviation between the write and read tracks is almost equal to D·sinθ (where θ is the skew angle, and D is the distance between the magnetic gap in the write head and that in the read head), the skew angle itself must be small and the variation of the arm tilt angle shown as in FIG. 2 formed where the line connecting the center of rotation of the actuator and the composite magnetic head crosses the track moving direction must be small in the magnetic head position, in order to suppress a deviation between the write and read tracks when the composite magnetic head is caused to access in the range from the inner to the outer circumference. That is, the arm-tilt angle is an angle formed between the rotating direction of the magnetic disk and a line passing through the center of rotation of the actuator and the magnetic gap of the composite magnetic head. The variation of the arm-tilt angle is equal to the variation of the skew angle.

Figure 2:
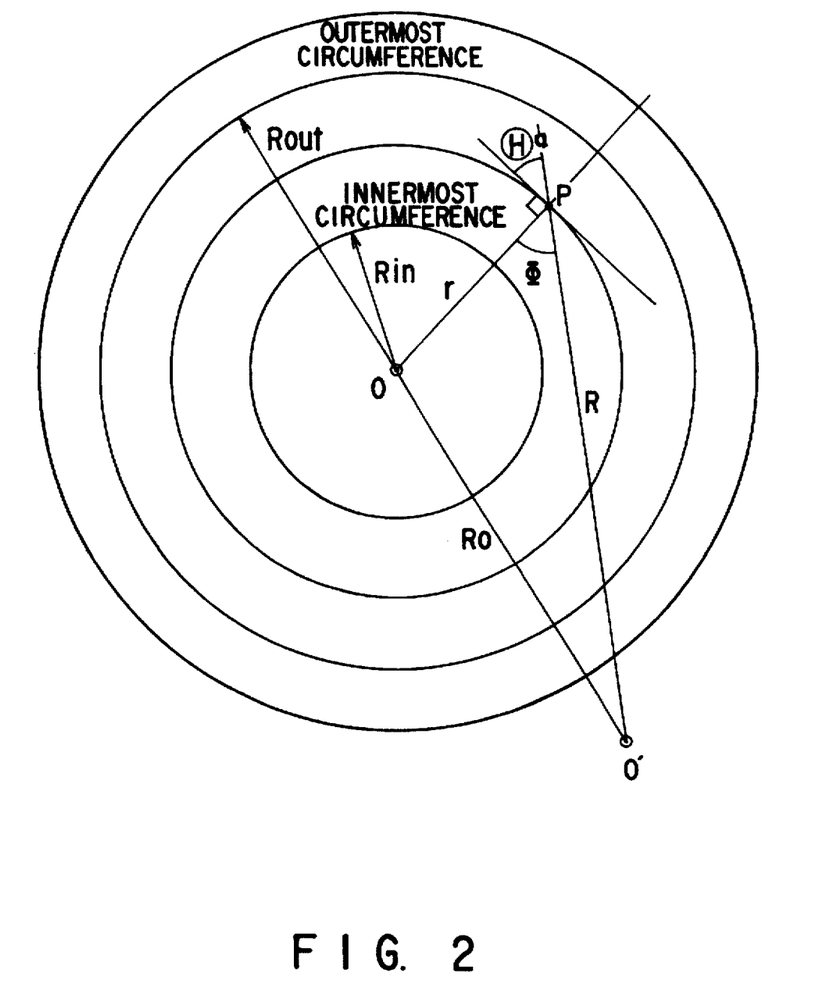
FIGS. 2, 3, and 4 are diagrams for explaining the operation of the present invention.
Figure 3:
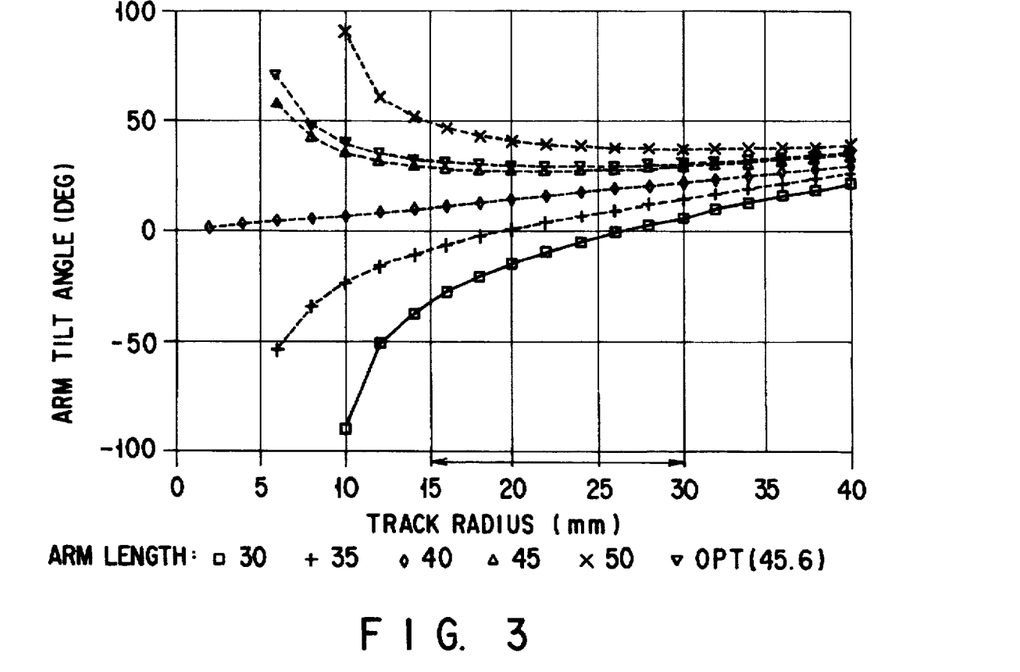
Figure 4:
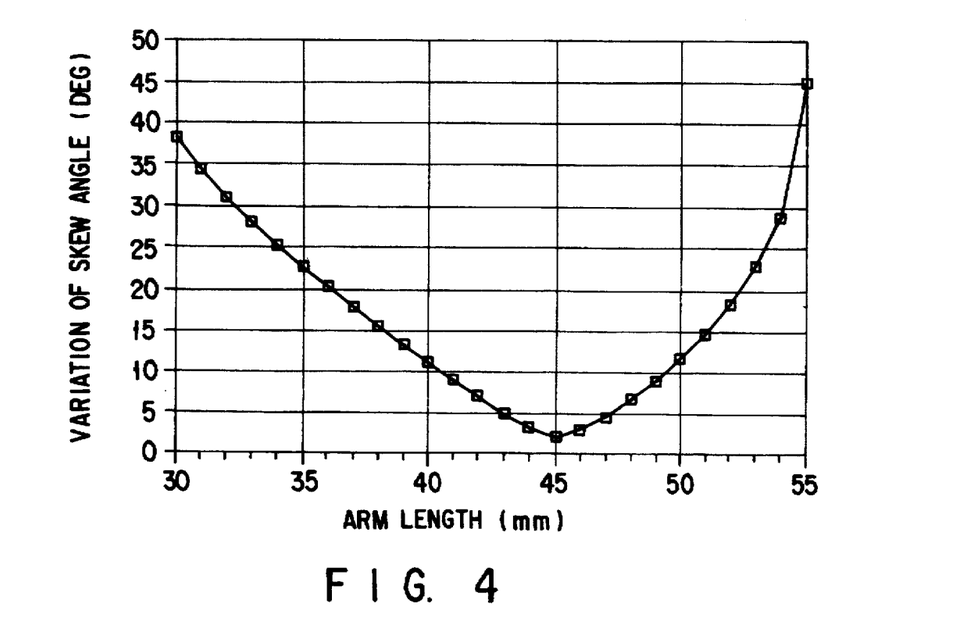

A schematic diagram of a magnetic disk drive using the rotary actuator system is shown in FIG. 2.

$$\Phi = \cos^{-1}(-(R_0^2 - R^2 - r^2)/(2RT \cdot r)) \quad (1)$$

$$\Theta a = (\pi/2) - \Phi$$

$$= (\pi/2) - \cos^{-1}(-(R_0^2 - R^2 - r^2)/(2R \cdot r))$$

where point O: the center of the magnetic disk
point O': the center of rotation of the rotary actuator
point P: the center of the gap in the write head
r: the length of segment O–P (corresponding to the radius at the magnetic head on the magnetic disk)
R: the length of segment O'–P (the length from the center of rotation of the rotary actuator to the magnetic head, hereinafter, referred to as the arm length)
$R_0$: the length of segment O–O'
φ: the angle formed where segment O–P and segment O'–P cross each other, and
θa: the arm tilt angle=$(\pi/2)-\phi$ Based on equation (1), the relationship between the position of the magnetic head on the magnetic disk and the arm tilt angle, using the arm length (R) as a parameter, is shown in FIG. 3. FIG. 3 shows an example where the radius r of the innermost track and the outermost track are 15 mm and 30 mm, respectively, and the distance ($R_0$) between the center of rotation of the actuator and the that of the disk is 40 mm. The arm length was varied in the range from 30 mm to 50 mm. As seen from FIG. 3, with the innermost and outermost tracks determined, when the arm length is short, the variation of the arm tilt angle in the range from the innermost to outermost tracks is large. As the arm length is made longer, the arm tilt angle itself becomes greater, but there is a point where the variation of the arm tilt angle reduces to a minimum. When the arm length is further increased, the arm tilt angle still increases, which permits the variation of the arm tilt angle to take a turn for an increase. This is shown in FIG. 4 that illustrates the relationship between the arm length and the variation (the difference between the maximum and minimum values) of the arm tilt angle in the range of, for example, 15 mm≦r≦30 mm as shown in FIG. 3. Specifically, when the range from the innermost to the outermost tracks is given, an arm length (R) to minimize the variation of the arm tilt angle exists in the range of >$R_0$. Setting such an arm length makes it possible to minimize the variation of the track deviation.

Table 2 lists the optimum values ($R_{opt}$) of arm length (R) when the distance ($R_0$) between the center of the disk and the center of rotation of the arm, the innermost circumference radius ($R_{in}$), and the outermost circumference radius ($R_{out}$) are given. Table 1 lists the variation of the skew angle at that time. Here, the innermost circumference radius ($R_{in}$), the outermost circumference ($R_{out}$), and the arm length (R) are all standardized provided that the distance ($R_0$) between the disk's center and the center of rotation of the arm is 1.

TABLE 1

Skew Angle Variation (ΔΘmin(degree))

| $R_{out}$ \ $R_{in}$ | 0.10 | 0.15 | 0.20 | 0.25 | 0.30 | 0.35 | 0.40 | 0.45 | 0.50 |
|---|---|---|---|---|---|---|---|---|---|
| 0.60 | 6.2 | 4.4 | 3.1 | 2.2 | 1.5 | 1.0 | 0.6 | 0.3 | 0.1 |
| 0.65 | 7.0 | 5.2 | 3.7 | 2.7 | 1.9 | 1.3 | 0.9 | 0.5 | 0.3 |
| 0.70 | 8.0 | 5.9 | 4.5 | 3.3 | 2.4 | 1.7 | 1.2 | 0.8 | 0.5 |
| 0.75 | 9.0 | 6.8 | 5.1 | 3.9 | 3.0 | 2.2 | 1.6 | 1.1 | 0.7 |
| 0.80 | 9.9 | 7.6 | 5.9 | 4.6 | 3.5 | 2.7 | 2.0 | 1.4 | 1.0 |
| 0.85 | 11.0 | 8.5 | 6.7 | 5.2 | 4.1 | 3.2 | 2.5 | 1.8 | 1.3 |
| 0.90 | 11.9 | 9.4 | 7.5 | 5.9 | 4.7 | 3.7 | 2.9 | 2.3 | 1.7 |
| 0.95 | 13.0 | 10.3 | 8.3 | 6.7 | 5.4 | 4.3 | 3.4 | 2.7 | 2.1 |
| 1.00 | 14.2 | 11.3 | 9.2 | 7.4 | 6.1 | 4.9 | 4.0 | 3.2 | 2.5 |

TABLE 2

Optimal Arm Length ($R_{opt}$)

| $R_{out}$ \ $R_{in}$ | 0.10 | 0.15 | 0.20 | 0.25 | 0.30 | 0.35 | 0.40 | 0.45 | 0.50 |
|---|---|---|---|---|---|---|---|---|---|
| 0.60 | 1.03 | 1.04 | 1.06 | 1.07 | 1.09 | 1.10 | 1.11 | 1.13 | 1.14 |
| 0.65 | 1.03 | 1.05 | 1.06 | 1.08 | 1.09 | 1.11 | 1.12 | 1.14 | 1.15 |
| 0.70 | 1.03 | 1.05 | 1.07 | 1.08 | 1.10 | 1.12 | 1.13 | 1.15 | 1.16 |
| 0.75 | 1.04 | 1.06 | 1.07 | 1.09 | 1.11 | 1.12 | 1.14 | 1.16 | 1.17 |
| 0.80 | 1.04 | 1.06 | 1.08 | 1.10 | 1.11 | 1.13 | 1.15 | 1.17 | 1.18 |
| 0.85 | 1.04 | 1.06 | 1.08 | 1.10 | 1.12 | 1.14 | 1.16 | 1.18 | 1.19 |
| 0.90 | 1.04 | 1.07 | 1.09 | 1.11 | 1.13 | 1.15 | 1.17 | 1.19 | 1.20 |
| 0.95 | 1.05 | 1.07 | 1.09 | 1.11 | 1.13 | 1.15 | 1.18 | 1.20 | 1.21 |
| 1.00 | 1.05 | 1.07 | 1.10 | 1.12 | 1.14 | 1.16 | 1.18 | 1.20 | 1.23 |

In the magnetic disk drive, if the outside diameter of the disk is $D_{out}$, this gives $D_{out}/2 < R_O$. Further, since $R_{out} < D_{out}/2$, then $R_{out} < 1$. The inside diameter ($D_{in}$) of the disk is determined by the size of a hole used to install a disk to a spindle motor. The innermost circumference radius ($R_{in}$) is normally in the range of $R_{in} > 0.3$ because $R_{in} > D_{in}/2$. To secure a wider data recording area, it is desirable that $R_{out}$ should be as large as possible and $R_{in}$ be as small as possible. The $R_{out}$ and $R_{in}$ of an actual magnetic disk drive are determined, taking into account the recording characteristics, CSS zone reservation, margin required by the mechanism, and others. Practically, they are:

$0.8 < R_{out} < 0.95$ and $0.3 < R_{in} < 0.45$

From the viewpoint of the variation of the skew angle shown in FIG. 1, it will be understood that an attempt to make $R_{in}$ small by using a special disk of a small $D_{in}$ to secure a more data area is undesirable. Therefore, from Table 1, a preferable standardized arm length practically lies in the range from 1.1 to 1.2 (within Table 1 and Table 2).

As described above, in Table 1 and Table 2, the optimum arm length ($R_{opt}$), the innermost track radius ($R_{in}$), and the outermost track radius ($R_{out}$) are all standardized provided that the distance ($R_O$) between the center of rotation of the disk and that of the actuator is 1.

For a first component requirement for the first magnetic disk drive of the present invention, the arm length is set at the length mentioned above.

For the second component requirement for the first magnetic disk drive, to minimize a track deviation caused by the skew angle, a composite magnetic head is constructed in at least one of the following ways:

(1) A composite magnetic head is installed on an arm with an offset being added to the skew angle to minimize the latter. This means that the skew angle is made smaller than the variation of the arm tilt angle on a given track in the range from the innermost to the outermost write track.

(2) A deviation between the write and read tracks due to the skew angle is minimized by stacking a write head and a read head so as to offset their relative position across the track width on the outer or inner circumference side on a given write track. This means that the deviation is suppressed so as to lie within the deviation between the write and read tracks due to the variation of the arm tilt angle.

As mentioned above, with the first magnetic disk drive of the present invention, a track deviation due to the skew angle can be minimized, so that a very great improvement in the track density can be expected as compared with the prior art.

Accordingly, with the first magnetic disk drive of the present invention, the variation of the track deviation due to the variation of the skew angle can be minimized. In addition, a track deviation due to the skew angle can be made smaller than the variation of the track deviation due to the variation of the arm tilt angle, so that a remarkable improvement in the write track density can be expected as compared with the prior art.

A second magnetic disk drive of the present invention is characterized in that the composite magnetic head, when located in any write track in the data read/write region on the magnetic disk, is constructed so as to meet both conditional expressions $r_{W0} \leq r_{R0}$ and $r_{W1} \geq r_{R1}$ simultaneously, provided that the track width of the write head is $W_W$, the track width of the read head $W_R$, the center of the magnetic disk point O, the ends of the magnetic gap in the write head on the magnetic disk outer and inner circumference sides points W and W', respectively, the ends of the magnetic gap in the read head on the magnetic disk outer and inner circumference sides points R and R', respectively, the length of segment O–W $r_{W0}$, the length of segment O–W' $r_{W1}$, the length of segment O–R $r_{R0}$, and the length of segment O–R' $r_{R1}$.

In the second magnetic disk drive, the condition of $r_{W0} \leq r_{R0}$ means that when the composite magnetic head is in the data read/write a region on the magnetic disk, the read track never goes beyond the write track toward the outer circumference of the magnetic disk. Further, the condition of $r_{W1} \geq r_{R1}$ means that when the composite magnetic head is in the data read/write region on the magnetic disk, the read track never goes beyond the write track toward the inner circumference of the magnetic disk. Therefore, by meeting the two conditions at the same time, the read track position either coincides with the write track position or is excluded from the latter.

$r_{W0}$, $r_{W1}$, $r_{R0}$, and $r_{R1}$ are all able to be expressed by the geometric relationships between the composite magnetic head, rotary actuator, and magnetic disk. Therefore, by determining the construction, dimensions, arrangement, and other factors of the composite magnetic head and rotary actuator so as to fulfill the aforesaid respective conditions, taking into account the geometric relationships, good recording and reproducing can be done without developing a deterioration caused by a track deviation between recording and reproducing.

As explained above, with the second magnetic disk drive of the present invention, the track position of the read head never goes beyond that of the write head. Further, even when the track density of the magnetic disk is increased, good recording and reproducing characteristics can be obtained.

Additionally, by combining the first and second magnetic disk drives into a magnetic disk drive, the track density can be improved remarkably since a deterioration problem caused by a track deviation is solved more effectively by the magnetic disk drive of the present invention.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Embodiments of the present invention will be explained, referring to the accompanying drawings.

Figure 5:
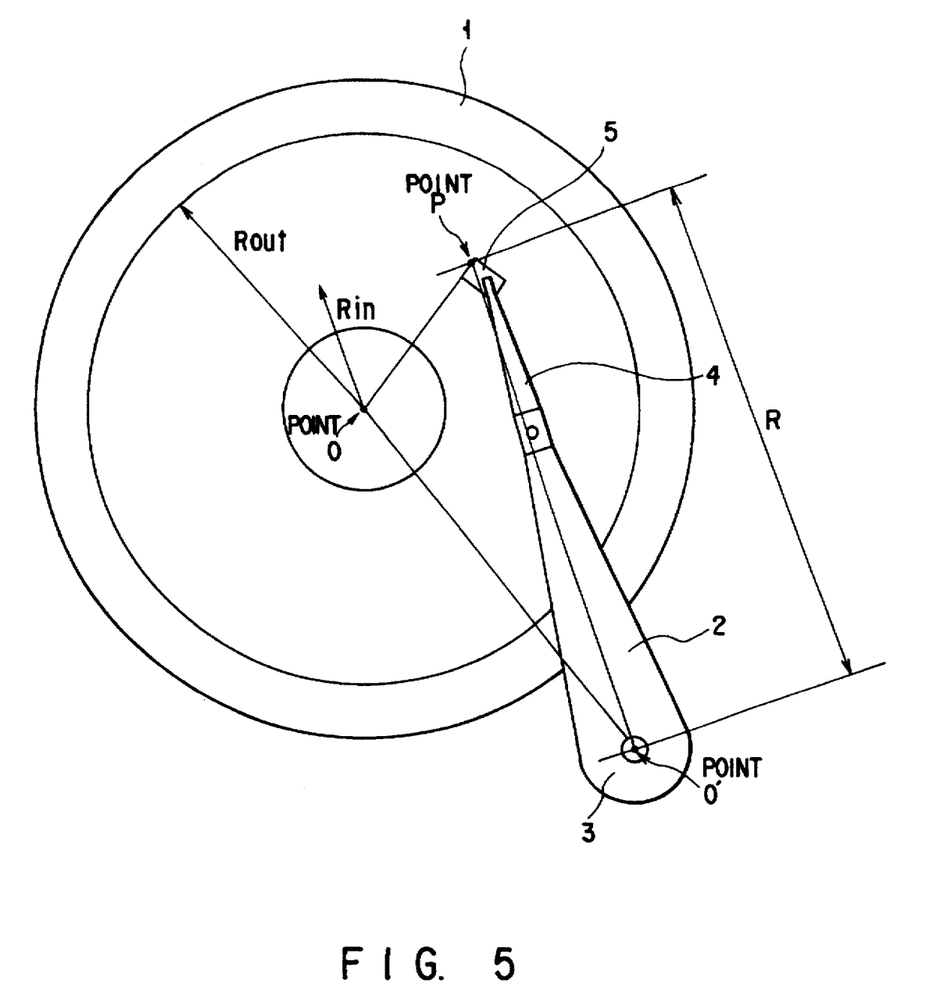
FIG. 5 is a schematic diagram of a magnetic disk drive according to a first embodiment of the present invention.

FIG. 5 is a schematic diagram of a magnetic disk drive according to a first embodiment of the present invention. In FIG. 5, the magnetic disk drive is basically composed of a magnetic disk 1, a rotary actuator arm 2 rotatable on a rotary axis of a rotary actuator 3, and a head slider 5 (hereinafter, also referred to as a composite magnetic head) provided with a write head and a read head (both not shown) which is secured to the arm 2 via a suspension 4.

In the FIG. 5 magnetic disk drive of the first embodiment, the length R from the center O' of rotation of the rotary actuator 3 to point P at the head slider 5 is optimized, and the magnetic head 5 is placed obliquely with respect to line O'-P.

Specifically, the length R of the rotary actuator is set so that, when the composite magnetic head is moved from a specified innermost write track position $R_{in}$ to the outermost write track position $R_{out}$ on the disk-like magnetic recording medium 1 by rotating the rotary actuator arm 2 on its center O' of rotation (arm axis 3), the variation (the same as the variation of the arm tilt angle) of the skew angle (that is, the angle formed where the direction perpendicular to the track width direction of the write and read heads of the composite magnetic head and the longitudinal direction of the write track of the medium in a position where the magnetic head faces the disk-like magnetic recording medium) may be almost minimized. At the same time, the composite magnetic head is installed obliquely to the suspension 4 so that the largest absolute value of the skew angle on a given track in the range from the innermost to the outermost write track may be almost minimized.

By constructing the magnetic disk drive as mentioned above, a track deviation due to the skew angle is minimized, thereby improving the track density.

Figure 6:
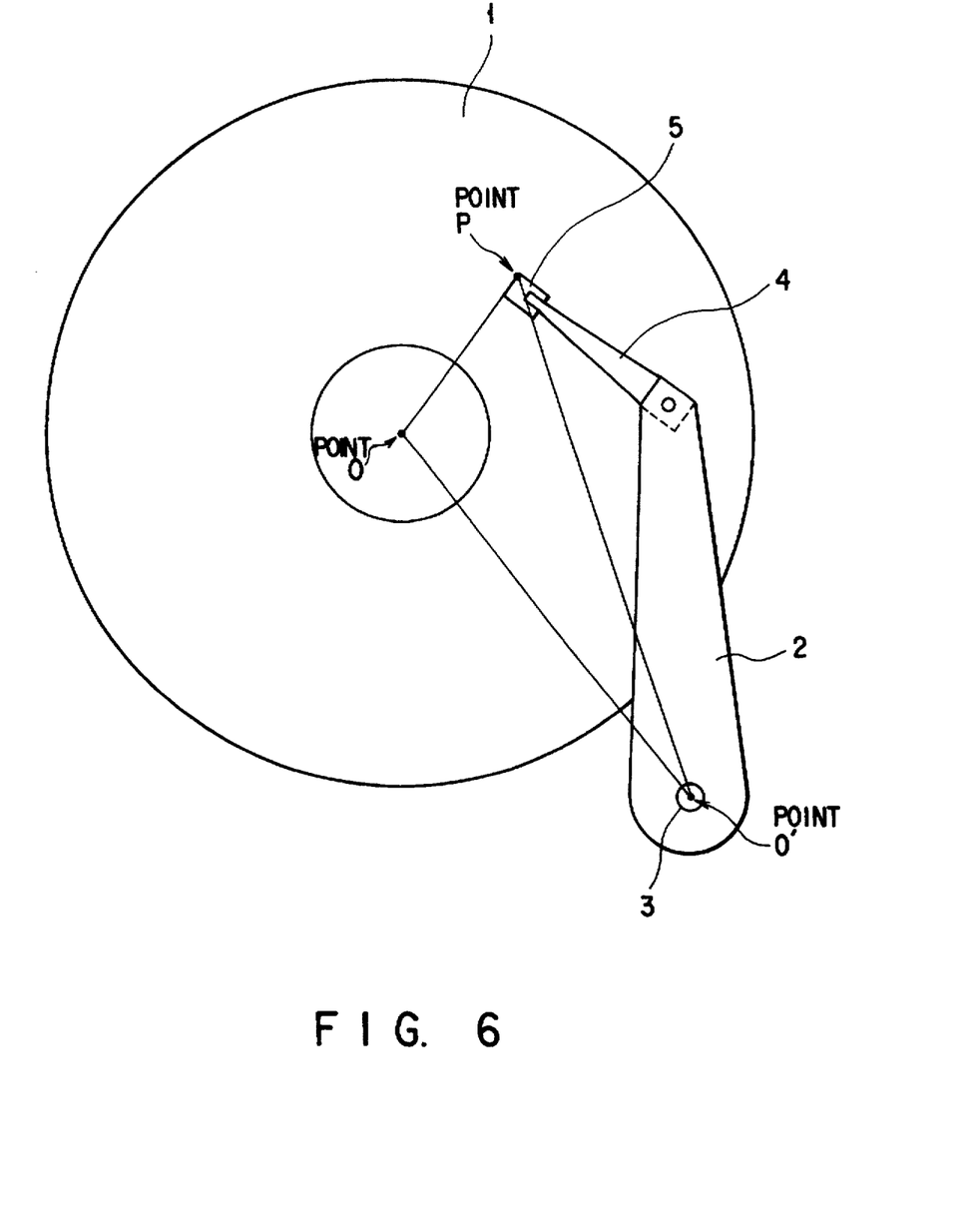
FIG. 6 is a diagram of a first modification of the first embodiment.

FIG. 6 shows a first modification of the first embodiment. The same parts as those of FIG. 5 are indicated by the same reference characters, and their detailed explanation will be omitted.

In FIG. 6, the length R of the rotary actuator is set so that, when the composite magnetic head is moved from a set innermost write track position $R_{in}$ to the outermost track position $R_{out}$ on the disk-like magnetic recording medium 1 by rotating the rotary actuator arm 2 on its center O' of rotation, the variation of the skew angle may be almost minimized. In addition, the suspension 4 provided with the composite magnetic head is installed obliquely to the rotary actuator arm 2 so that the largest absolute value of the skew angle may be almost minimized.

By constructing the magnetic disk drive as mentioned above, a track deviation due to the skew angle is also minimized, thereby improving the track density.

Figure 7:
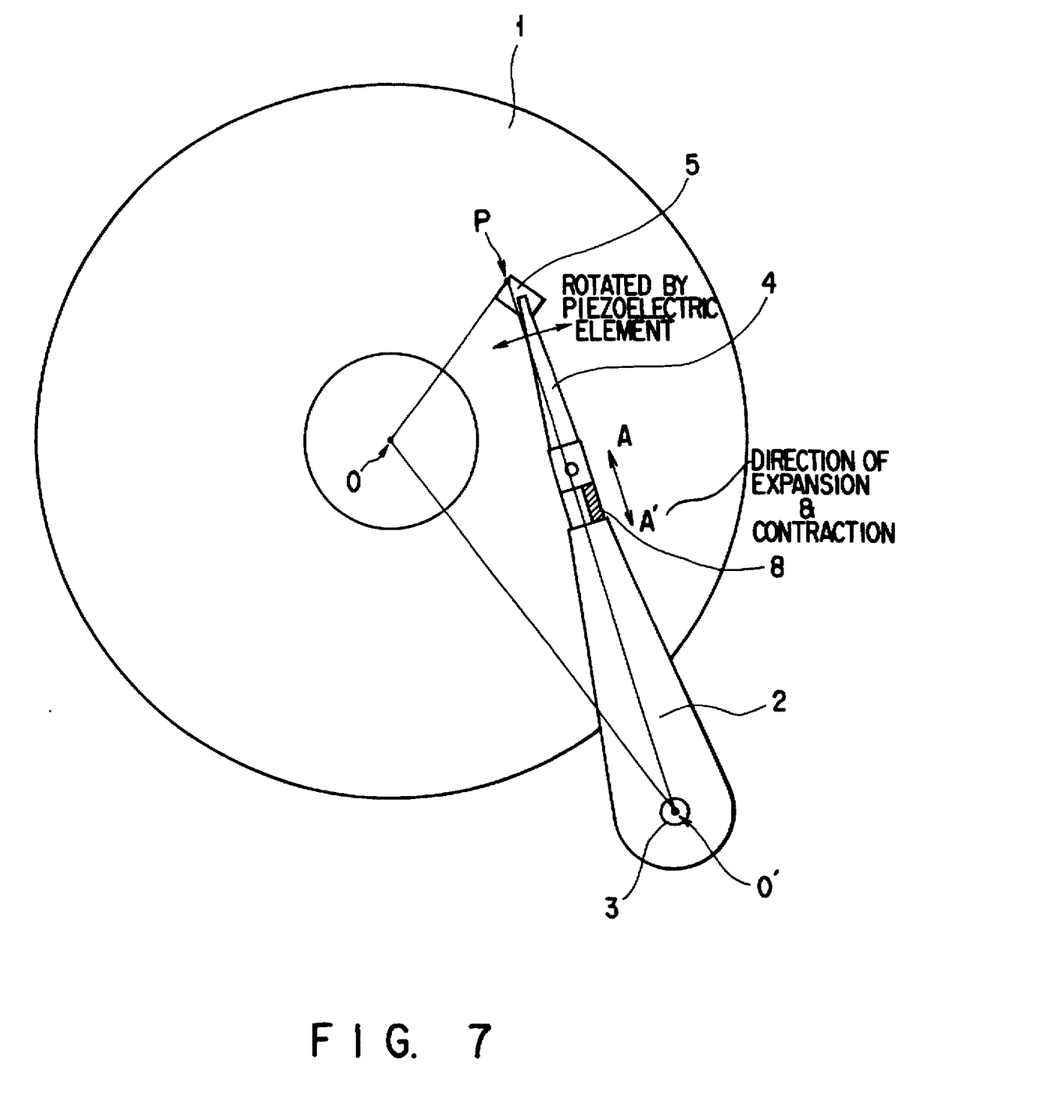
FIG. 7 is a diagram of a second modification of the first embodiment.

FIG. 7 shows a second modification of the first embodiment. The same parts as those of FIG. 5 are indicated by the same reference characters, and their detailed explanation will be omitted. The magnetic disk drive of FIG. 7 differs from that of FIG. 5 in that a piezoelectric element 8 for rotating the suspension 4 is provided between the rotary actuator arm 3 and the suspension 4.

According to the second modification of FIG. 7, the magnetic disk drive is constructed so that a deviation between the write and read tracks may be completely reduced to zero by adjusting the amount of displacement of the piezoelectric element 8 (expanding and contracting in the direction of arrow A–A') according to the variation of the skew angle due to the variation of arm tilt angle, in the range from the innermost to the outermost write track. Although in FIG. 7, the magnetic head is installed obliquely to the suspension 4 as in FIG. 5, the suspension 4 may be installed obliquely to the rotary actuator arm 3 as shown in FIG. 6, and further the amount of the displacement of the piezoelectric element 8 be adjusted according to the arm tilt angle so as to completely reduce a track deviation to zero.

By constructing as described above, the magnetic disk drive of the present invention can eliminate a deviation between the write and read tracks almost completely, thereby improving the track density remarkably.

Figure 8:
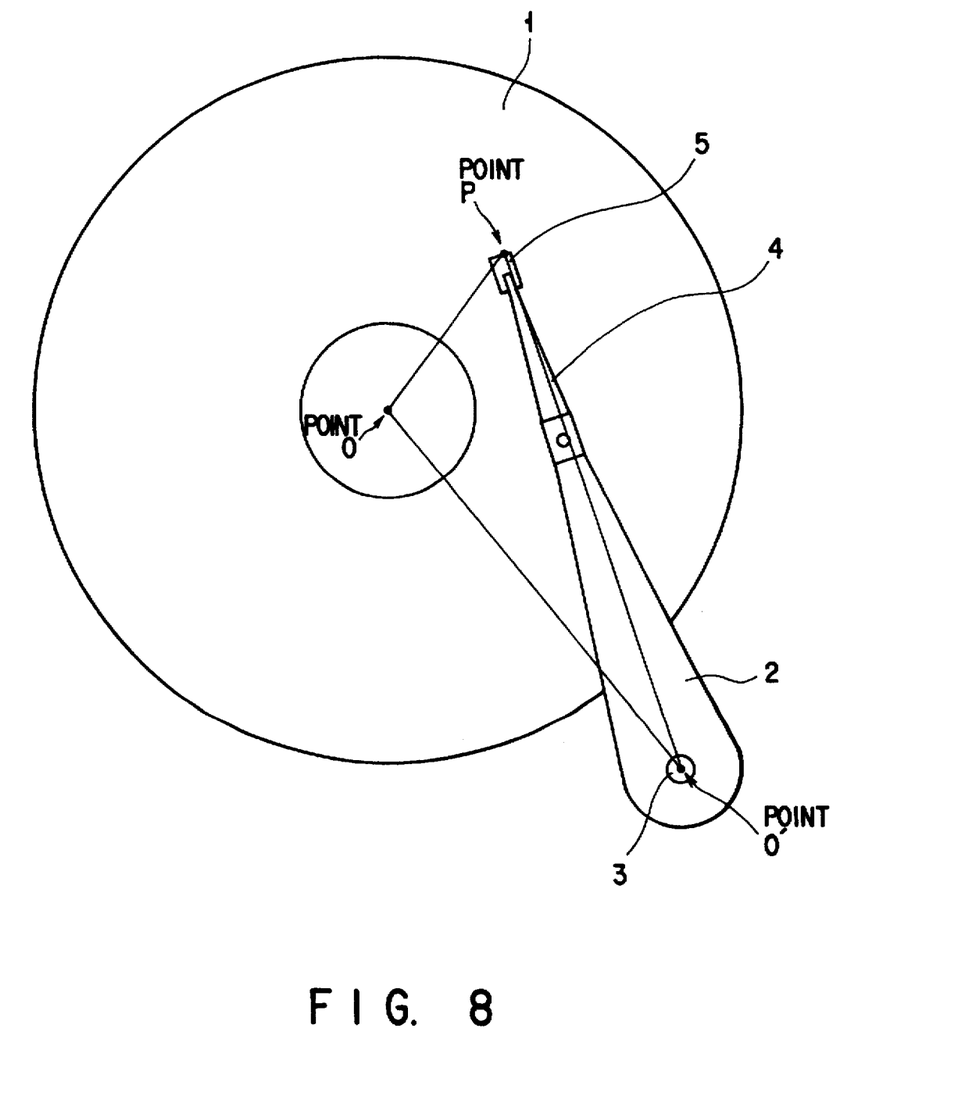
FIG. 8 is a diagram of a third modification of the first embodiment.

FIG. 8 shows a third modification of the first embodiment. The same parts as those of FIG. 5 are indicated by the same reference characters, and their detailed explanation will be omitted.

Figure 9:
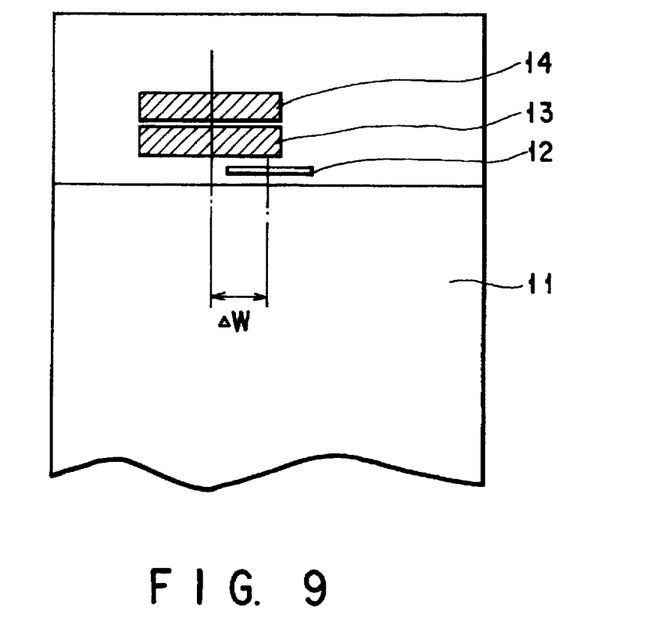
FIG. 9 is a view of the head portion of the embodiment shown in FIG. 8.
Figure 10:
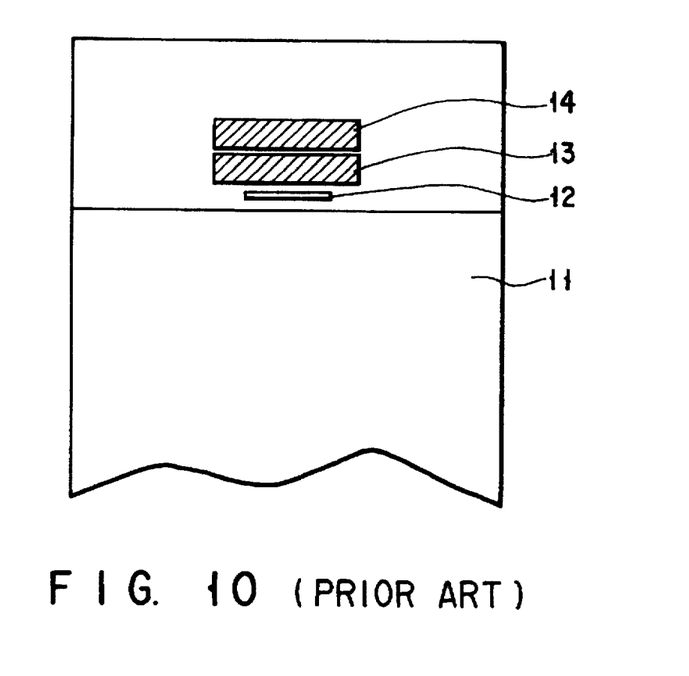
FIG. 10 is a view of the head portion of the conventional equivalent.

In FIG. 8, the length R of the rotary actuator is set so that, when the composite magnetic head is moved from a set innermost write track position $R_{in}$ (the same as in FIG. 5 although not shown. Similarly, in the subsequent figures, when the same symbols such as $R_{out}$ and R are used to indicate the same things, their representations will be omitted) to the outermost write track position $R_{out}$ on the disk-like magnetic recording medium 1 by rotating the rotary actuator arm 2 on its center O' of rotation, the variation of the skew angle may be almost minimized. In addition, the center of the write gap is shifted from the center of the read gap in the composite magnetic head as shown in FIG. 9 so that the largest absolute value of the skew angle may be almost minimized. Therefore, it is possible to minimize a positional deviation between the write and read heads which was a problem with the head of the conventional stacked arrangement of FIG. 10.

Figure 11:
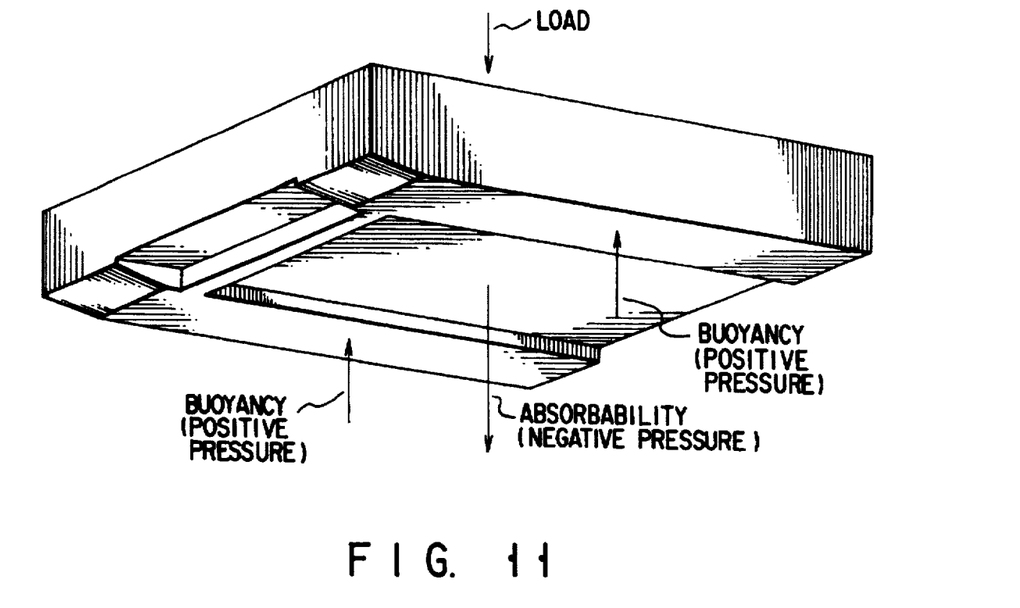
FIG. 11 is a view of a head used in another embodiment of the present invention.

FIG. 11 shows a magnetic head applied to a magnetic disk drive of the present invention.

The magnetic head employs as a magnetic head slider what is called a negative-pressure slider where a slider has a negative-pressure generator. As noted earlier, the present invention is characterized in that the arm tilt angle is made almost constant over the range from the inner to outer circumferences. Therefore, a conventional method used to make the head flying height constant over the range from the inner to outer circumferences cannot be applied. Specifically, it is impossible to apply a method of suppressing the variation of head flying height between the inner and outer circumferences by setting the skew angle smaller at the inner circumference and larger at the outer circumference, or a method making use of the variation of skew angle, such as what is called TPC (Transverse Pressure Contour) techniques in which steps are provided on the ABS surface, and the width of the steps is suitably set so that almost constant flying characteristics may be realized by suppressing the variation of the head flying height, making use of the skew angle varying over the range from the inner to the outer circumference. As a result, when the circumferential speed exceeds a certain value, the positive pressure balances with the negative pressure, which makes it effective in the magnetic disk drive of the present invention to use a slider with the characteristics of a negative-pressure slider whose flying height does not depend much on the circumferential speed.

Figure 12:
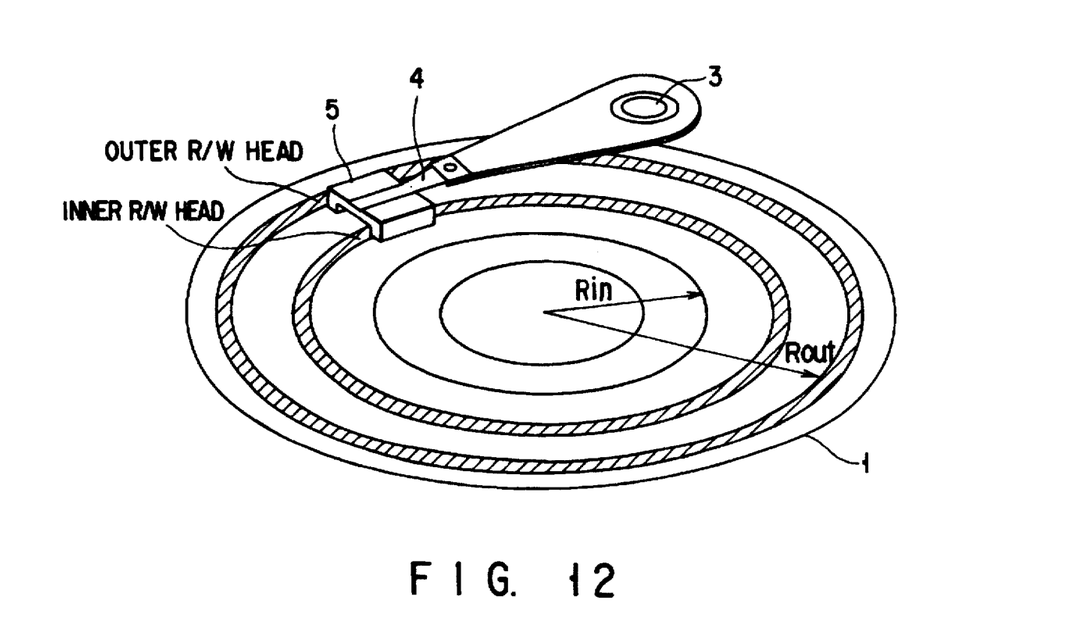
FIG. 12 is a view of another embodiment of the present invention.

FIG. 12 shows another magnetic head applied to a magnetic disk drive of the present invention.

In a case where a magnetic head slider has a plurality of write/read heads as disclosed in U.S. Pat. No. 5,010,430, for example, when two pairs of write/read heads are placed on the outer circumference-side slider and the inner circumference-side slider, and the outer half tracks are read from and written into by the heads on the outer circumference-side slider, and the inner half tracks are read from and written into by the heads on the inner circumference-side slider, the amount of deviation (equal to D·sinθ as noted earlier) between the write/read heads is halved from the beginning because the angle through which the actuator seeks is halved. This is advantageous as compared with a case where there is only a pair of heads provided. In a method where the entire magnetic head slider is installed in a tilted position because the tilt angle of each arm of the heads on the outer circumference-side and inner circumference-side sliders and their variation differ slightly from each other, it is impossible to set a track deviation of each head to a minimum. In this case, by setting the deviation of the mask patterns for the write and read heads optimum for each head in stacking the write and read heads, a track deviation can be minimized for all the heads.

While in the above embodiment, the ring inductive head is used as the write head to record onto a longitudinal recording medium, and the MR head is used for reproducing, the present invention may, of course, be applied to a case where a write head, a read head, and a recording medium based on different principles from the above-described embodiments of the invention, such as a composite head in which a single pole head suitably designed to record onto a perpendicular recording medium is combined with an MR read head.

With the magnetic disk drive of the first embodiment, by optimizing the length of the actuator arm, and by either installing the heads obliquely on the arm, or shifting the write and read heads from each other in the track width direction and stacking them, or by doing both, the recording density can be improved.

The following explanation will be given as to how to optimize the positional relationship between the write and read heads of the magnetic head applied to the magnetic disk drive to further improve the recording density.

Figure 13:
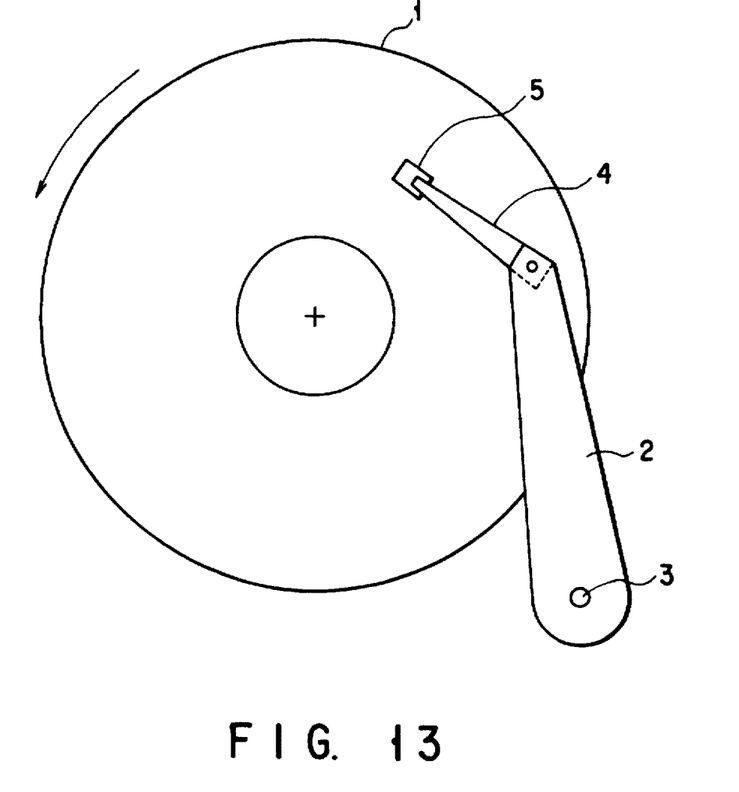
FIG. 13 is a plan view of a magnetic disk drive according to a second embodiment of the present invention.

FIG. 13 shows a magnetic disk drive according to a second embodiment of the present invention. The same parts as those of FIG. 5 are indicated by the same reference characters, and their detailed explanation will be omitted.

In FIG. 13, numeral 1 indicates a magnetic disk, and 2 the arm of a rotary actuator. The arm 2 rotates on an arm axis 3. A head slider 5 provided with a write head and a read head is secured to the tip portion of the arm 2 via a suspension 4.

Figure 14:
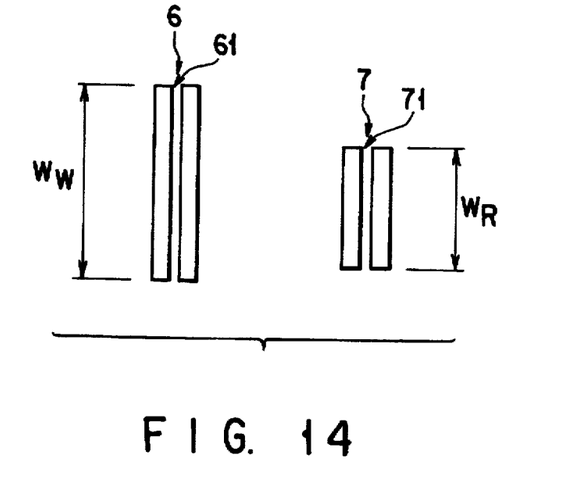
FIG. 14 is a positional relationship between the write head and read head on the head slider of the magnetic disk drive of FIG. 13.

FIG. 14 is a diagram showing the positional relationship between the write and read heads on the head slider 5. In the figure, numeral 6 indicates the write head such as an inductive thin-film head, and 7 the read head such as a magnetoresistive head. The write head 6 and the read head 7 are positioned so that their magnetic gaps 61 and 71 may be parallel with each other. In the figure, reference character $W_W$ indicates the track width of the write head 6, and $W_R$ the track width of the read head 7.

Figure 15:
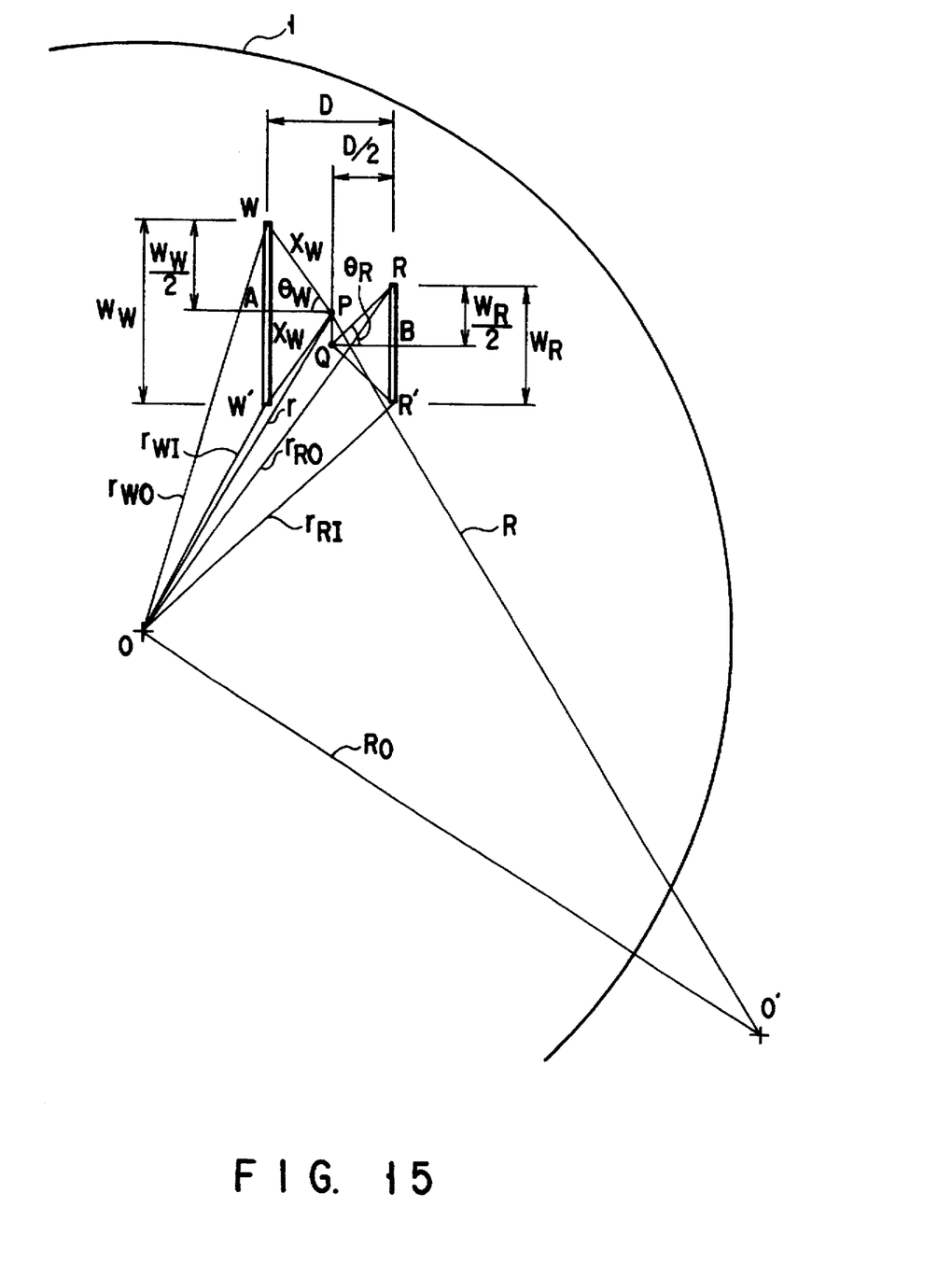
FIG. 15 is a diagram for explaining the relationship between the position of each head and the center of the magnetic disk.

FIG. 15 is a diagram used to explain the relationship between the position of the respective heads 6 and 7 and the center of the magnetic disk drive 1. In the figure, the track widths $W_W$ and $W_R$ of heads 6 and 7 are enlarged for the sake of explanation.

First, the respective points and parameters in the figure are defined as follows:

Point O: the center of the magnetic disk 1

Point O': the center of rotation of the actuator arm 2

$W_W$: the track width of the write head 6 (the length of segment W–W')

$W_R$: the track width of the read head 7 (the length of segment R–R')

D: the distance between segment W–W' and segment R–R' parallel to each other

Point A: the center of segment W–W'

Point P: a point perpendicularly D/2 away from segment W–W' toward the read head 7;

Point B: the center of segment R–R'

Point Q: a point perpendicularly D/2 away from segment R–R' toward the write head 6;

$X_W$: the length of segment W–P and segment W'–P $\theta_W$: an angle formed where segment W–P and segment R'–P cross segment W–P $X_R$: the length of segment R–P and segment R'–P $\theta_R$: an angle formed where segment R–P and segment R'–P cross segment B–P r: the length of segment O–P R: the length of segment O'–P $R_0$: the length of segment O–O'

ΔW: the distance between point P and point Q

η: an angle formed where segment O'–P crosses segment A–P $r_{W0}$: the length of segment O–W $r_{W1}$: the length of segment O–W'

$r_{R0}$: the length of segment O–R $r_{R1}$: the length of segment O–R'

In the magnetic disk drive of the present embodiment, the respective parameters described above are selected so as to always meet the following conditional expressions (1) and (2) simultaneously, when the composite magnetic head, or both of the write head 6 and read head 7 on the head slider 5, is in any write track in the data read/write region on the magnetic disk 1:

$$r_{W0} \leq r_{R0}$$

$$r_{R1} \leq r_{W1}$$

Expression (1) means that when the composite magnetic head is in the data read/write region on the magnetic disk 1, the read track never goes beyond the write track toward the disk outer circumference. Expression (2) means that when the composite magnetic head is in the data read/write region on the magnetic disk 1, the read track never goes beyond the write track toward the disk inner circumference. Therefore, by fulfilling these two expressions at the same time, stable reproduction of recorded signals is possible at high track density.

Shown below are equations to obtain the respective parameters in the above expressions (1) and (2):

$$r_{W0} = \{r^2 + X_W^2 - 2rX_W \cos((\pi/2) - \phi + \theta_W)\}^{1/2}$$

$$r_{W1} = \{r'^2 + X_W^2 - 2r'X_W \cos((\pi/2) - \phi - \theta_W \pm \Delta\theta)\}^{1/2}$$

$$r_{R0} = \{r^2 + X_R^2 - 2rX_R \cos((\pi/2) - \phi + \theta_R \pm \Delta\theta)\}^{1/2}$$

$$r_{R1} = \{r'^2 + X_R^2 - 2r'X_R \cos((\pi/2) - \phi + \theta_R \pm \Delta\theta)\}^{1/2}$$

As for ± sign in front of Δθ, + sign corresponds to a case where point Q is closer to the disk outer circumference than point P, and − sign corresponds to a case where point Q is closer to the disk inner circumference than point P.

In the above equations, where:

$$\phi = \eta - (\pi/2) + \cos^{-1}\{(r^2 + R^2 - R_0^2)/2rR\}$$

$$\theta_W = \cos^{-1}\{D/(W_W^2 + D^2)^{1/2}\}$$

$$\theta_R = \cos^{-1}\{D/(W_R^2 + D^2)^{1/2}\}$$

$$X_W = (1/2) \cdot (W_W^2 + D^2)^{1/2}$$

$$X_R = (1/2) \cdot (W_R^2 + D^2)^{1/2}$$

$$r' = \{r^2 + \Delta W^2 - 2r\Delta W \cos((\pi/2) - \phi + \theta_W + \tan^{-1}(D/W_W))\}^{1/2}$$

a case where point Q is closer to the disk outer circumference than point P $$r' = \{r^2 + \Delta W^2 - 2r\Delta W \cos(-\phi + \theta_W + \tan^{-1}(D/W_W))\}^{1/2}$$

a case where point Q is closer to the disk inner circumference than point P $$\Delta\theta = \cos^{-1}\{(r^2 + r'^2 - \Delta W^2)/2rr'\}$$

Figure 16:
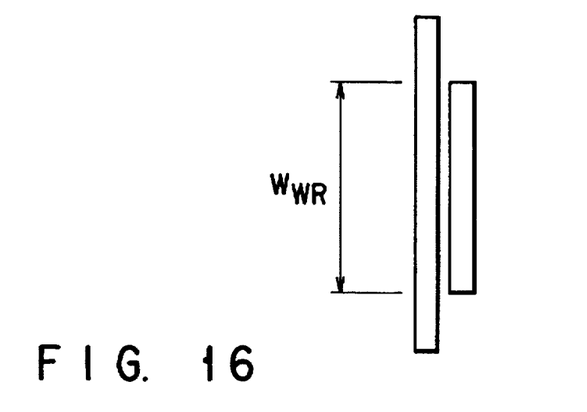
FIG. 16 is a diagram for defining the track width of a ring-type write head and read head.
Figure 17:
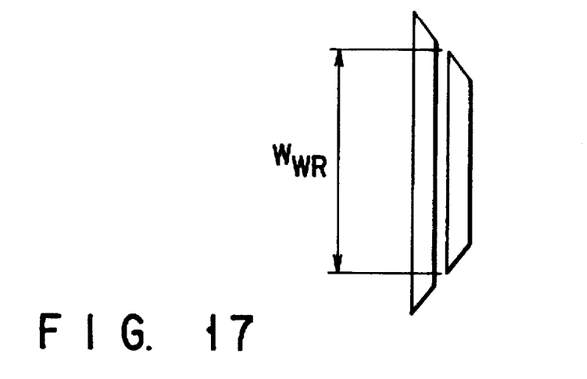
FIG. 17 is a diagram for defining the track width of another ring-type write head and read head.
Figure 18:
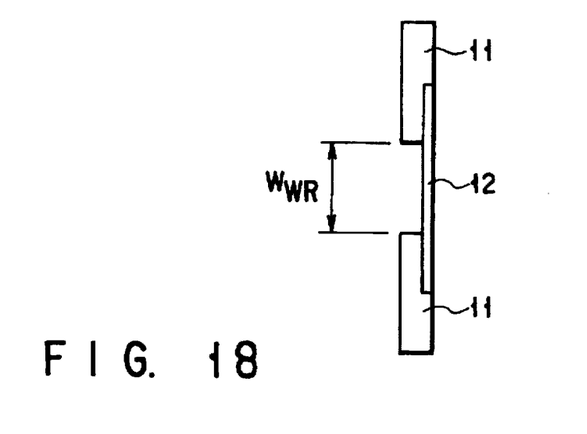
FIG. 18 is diagram for defining the track width of an MR head.

The second embodiment of the present has been explained above. According to the example of FIG. 14, what are shown in FIGS. 16 and 17 may be considered as the write/read heads. The track width of each head corresponds to the portion indicated by $W_{WR}$ where the magnetic gap is sandwiched as in FIG. 14. Either head is a ring-type head. As for the MR head, the width of the MR element 12 sandwiched between conductors (leads for flowing sense current) 11 is the track width $W_{WR}$ as shown in FIG. 18.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive that records and reproduces data onto and from a magnetic disk with a plurality of recording tracks including an innermost track and an outermost track, comprising:

a rotary actuator;

a magnetic head unit having a magnetic gap structure; and a rotary actuator arm with a first end connected to said rotary actuator and a second end connected to said magnetic head unit, wherein said rotary actuator arm has a fixed length which is determined to minimize a variation of a skew angle created between a magnetic gap length direction of said magnetic gap structure and a rotating direction of said magnetic disk as said magnetic head unit passes over said plurality of tracks so that said skew angle is substantially constant as said magnetic head passes between said innermost and said outermost track, wherein:

said magnetic head unit comprises a composite head having a write element and a read element; and said read element is stacked, with said write element being shifted from the read element in the track width direction toward one of the outermost track and the innermost track, so as to compensate for a track misregistration due to an absolute value of said skew angle.

2. A magnetic disk drive according to claim 1, wherein said rotary actuator arm has an arm length to minimize a variation of an arm tilt angle formed where a line connecting a center of rotation of said rotary actuator arm and said magnetic gap of said magnetic head crosses the rotating direction of said magnetic disk.

3. A magnetic disk drive according to claim 1, wherein said magnetic head unit is mounted obliquely with respect to a line connecting a center of rotation of said actuator and said magnetic head unit to minimize the largest absolute value of the skew angle.

4. A magnetic disk drive according to claim 3, wherein said magnetic disk drive has a head suspension on the first end of said rotary actuator arm, and said magnetic head is placed obliquely on said head suspension.

5. A magnetic disk drive according to claim 3, wherein said rotary actuator arm is composed of a first arm and a second arm provided with said magnetic head unit, with said first arm and said second arm arranged at a fixed angle to each other.

6. A magnetic disk drive according to claim 5, wherein said second arm is a head suspension.

7. A magnetic disk drive according to claim 3, wherein said rotary actuator arm is composed of a first arm, a second arm, and a head suspension provided with said magnetic head unit, an actuator for adjusting an angle formed where said first arm and said second arm cross each other is provided between said first arm and said second arm, and an absolute value of said skew angle is set by said actuator so as to become substantially zero.

8. A magnetic disk drive according to claim 1, said magnetic head includes a magnetic head slider which has a negative pressure generating section.

9. A magnetic disk drive that records and reproduces data onto and from a magnetic disk with a plurality of recording tracks including an innermost track and an outermost track, comprising:

a rotary actuator;

a magnetic head unit having a magnetic gap structure; and a rotary actuator arm with a first end connected to said rotary actuator and a second end connected to said magnetic head unit, wherein said rotary actuator arm has a fixed length which is determined to minimize a variation of a skew angle created between a magnetic gap length direction of said magnetic gap structure and a rotating direction of said magnetic disk as said magnetic head unit passes over said plurality of tracks so that said skew angle is substantially constant as said magnetic head passes between said innermost and said outermost track, wherein said magnetic head unit comprises a composite head having a read head including a read magnetic gap and a write head including a write magnetic gap, said composite magnetic head, when located in a data read/write area of said magnetic disk, meets both conditional formulas $r_{wo} \leq$ and $r_{w1} \leq r_{R1}$ simultaneously where $r_{wo}$ is a length of a segment O–W, $r_{w1}$ is a length of a segment O–W'; $r_{Ro}$ is a length of a segment O–R, and $r_{R1}$ is a length of segment O–R', when a center of said magnetic disk is O, ends of said magnetic write gap in said write head on the magnetic disk outer and inner circumference sides points are W and W', respectively and ends of said magnetic read gap in said read head on the magnetic disk outer and inner circumference sides points are R and R', respectively.

10. In a magnetic disk drive having a magnetic disk with recording tracks including an innermost track and an outermost track, a composite magnetic head unit having a write element having a write gap and a read element having a read gap which said unit having functions of writing/reading information to said magnetic disk, wherein said composite magnetic head, when located in a data area on said magnetic disk, meets both conditional formulas $r_{wo} \leq r_{Ro}$ and $r_{w1} \leq r_{R1}$ simultaneously, where $r_{wo}$ is a length of a segment O–W, $r_{w1}$ is a length of a segment O–W', $r_{ro}$ is a length of a segment O–R, and $r_{R1}$ is a length of segment O–R', when a center of said magnetic disk is O, ends of said magnetic write gap in said write head on the outermost and innermost track sides are W and W', respectively, and ends of said magnetic read gap in said read head on the outermost and innermost track sides are R and R', respectively, whereby said skew angle is substantially constant as said magnetic head unit passes between said innermost track and said outermost track.

11. A magnetic disk drive according to claim 10, further comprising:

rotary actuator; and a rotary actuator arm on which said composite magnetic head is mounted, wherein said arm has a length in the range of 1.1 to 1.2 $R_0$, where $R_0$ is a distance between a center of revolution of said magnetic disk and a center of rotation of said rotary actuator.

12. A magnetic disk drive according to claim 10, wherein said read element is stacked, with said write element being shifted from the read element in a track width direction toward one of the outermost track and the innermost track, so as to compensate for a track misregistration due to an absolute value of said skew angle.

* * * * *